United States Patent
Yamada et al.

(10) Patent No.: US 6,871,109 B2
(45) Date of Patent: Mar. 22, 2005

(54) DIE DESIGN SUPPORT METHOD AND DIE DESIGN SUPPORT SYSTEM

(75) Inventors: Shinjiro Yamada, Kawasaki (JP); Seiki Sato, Kawasaki (JP); Atsuo Suzuki, Kawasaki (JP); Takao Ikeda, Kawasaki (JP); Katsuji Iwasaki, Shibuya (JP); Daichi Ninagawa, Kawasaki (JP); Kazuhiro Kuwahara, Kawasaki (JP); Junya Uramoto, Kawasaki (JP); Atsushi Miyadera, Kawasaki (JP); Atsushi Sakurai, Kawasaki (JP)

(73) Assignee: INCS, Inc., Kawasaki (JP)

( * ) Notice: Subject to any disclaimer, the term of this patent is extended or adjusted under 35 U.S.C. 154(b) by 168 days.

(21) Appl. No.: 10/400,199

(22) Filed: Mar. 26, 2003

(65) Prior Publication Data

US 2004/0193298 A1 Sep. 30, 2004

(51) Int. Cl.$^7$ ............................................. G06F 19/00
(52) U.S. Cl. ......................... 700/98; 700/95; 700/118; 700/197; 703/7
(58) Field of Search .............................. 700/90, 95, 97, 700/98, 118, 163, 197; 703/1, 7

(56) References Cited

U.S. PATENT DOCUMENTS

| | | | |
|---|---|---|---|
| 5,659,478 A | * | 8/1997 | Pennisi et al. ................ 700/95 |
| 5,731,982 A | | 3/1998 | Namba et al. |
| 5,822,206 A | | 10/1998 | Sebastian et al. |
| 6,021,270 A | | 2/2000 | Hanaki et al. |
| 6,140,832 A | * | 10/2000 | Vu et al. ..................... 324/765 |

FOREIGN PATENT DOCUMENTS

| | | |
|---|---|---|
| JP | 61-260965 | 11/1986 |
| JP | 62-114061 | 5/1987 |
| JP | 5-257996 | 10/1993 |
| JP | 6-4117 | 1/1994 |
| JP | 7-105244 | 4/1995 |
| JP | 7-334555 | 12/1995 |
| JP | 10-225939 | 8/1998 |
| JP | 11-213022 | 8/1999 |
| JP | 2000-185324 | 7/2000 |
| JP | 2000-260706 | 9/2000 |
| JP | 2001 107 6015 | 3/2001 |
| JP | 2002-56032 | 2/2002 |
| JP | 2002-56033 | 2/2002 |
| JP | 2002-149721 | 5/2002 |
| JP | 2002 321225 A | 5/2003 |

* cited by examiner

*Primary Examiner*—Jayprakash N. Gandhi
(74) *Attorney, Agent, or Firm*—Martin Fleit; Paul D. Bianco; Fleit Kain Gibbons Gutman Bongini & Bianco P.L.

(57) ABSTRACT

The present invention provides a die design support method and system capable of reducing the time-period required for a die design, allowing an unskilled die engineer to perform a die design without difficulties, and coping with a product design change in a short time-period. A standard die design procedure is stored as "master die data" in advance using a function of a CAD system or the like. When a product design data is entered, the design procedure is automatically executed to the design data in accordance with the stored master die data. Preferably, the entire master die data is divided into a plurality of processes, such as a process of creating a scaling model, and a process of creating a parting model.

2 Claims, 6 Drawing Sheets

DIE DESIGN SUPPORT METHOD AND DIE DESIGN SUPPORT SYSTEM

FIELD OF THE INVENTION

The present invention relates to a decision support system using a computer to design a die for molding a product.

BACKGROUND OF THE INVENTION

In late years, a CAD (computer-aided design) system incorporating CAD software in a computer is widely used in designing not only a product but also a die for molding the product. Taking a resin molding die for example, the CAD system is used to determine various design factors of the resin molding die, such as cavity configuration, parting line, component layout, cooling system.

The term "cavity" therein means a space formed in a molding die to receive therein an injected molten molding material such as resin and solidify the material therein so as to mold a product. While the cavity has a configuration analogous to that of a product to be molded, the product is practically molded with a different configuration from that of the cavity due to contraction caused in the molding material during its solidification. That is, it is required to determine the cavity configuration in consideration of contraction to be caused in the molding material. In addition, a striped strain or deformation, so-called sink mark, can be undesirably created in a product due to contraction caused in the molding material during its solidification. For preventing the sink mark from occurring, a cavity should be designed under the estimation of a cavity region causing a sink mark to allow a slightly increased amount of molding material to be supplied to the estimated region of a cavity for casting products or to allow a slightly reduced amount of molding material to be supplied to the estimated region a cavity for resin products. Typically, an engineer designs a cavity in a virtual space on a CAD system while conceptually constructing a 3-dimensional configuration of the cavity from 2-dimensional design drawings of a product in consideration of the contraction coefficient of a molding material to be used and an estimated cavity region causing a sink mark.

It is also required to divide the die into an upper-die-half and a lower-die-half by an appropriate plane to allow the product to be released from the die. The parting line can be defined as a line of intersection between the above plane and the cavity. This parting line is determined in consideration of an undercut of the product die and other factors.

If a product including an undercut portion or a lateral hole is molded only by a die consisting of an upper-die-half and a lower-die-half, it cannot be released from the die. In this case, a sliding core is essentially included as one of the components of the die. Thus, a layout design for determining the arrangement of the upper-die-half, the lower-die-half and the sliding core will be additionally required.

A die engineer designs a die through the aforementioned operations on a CAD system. The resultingly obtained CAD data can be used as a numerical control (NC) data. A metal machine tool has been automated to a considerable extent, and the obtained NC data can be entered into the machine tool to machine a metal material for a die.

While the conventional die design essentially includes various operations requiring skills for conceptually constructing a 3-dimensional cavity configuration of a die from 2-dimensional design drawings of a product to be molded by the die, and determining a die parting line and a die layout base on the determined cavity configuration, it is practically difficult for unskilled die engineers to master such operations in a short period.

In addition, a product-engineer's intention about a product configuration is not always expressed by 2-dimensional design drawings, and consequently a desirable 3-dimensional die configuration cannot be adequately specified from the 2-dimensional design drawings in some cases. In these cases, a die engineer must design a 3-dimensional die configuration while reasonably estimating the product-engineer's intention in accordance with his/her past experiences. Such an operation is not accomplished without a fairly high skill, and it is often the case that an unskilled die engineer keeps the operation going without awaking to inaccuracy in the design drawings, and consequently designs an erroneous die including an spatial inconsistency and/or an unattainable 3-dimensional configuration.

In the die design based on the above procedure, the die design can be initiated only after an associated product design has been completed. While a product engineer often desires to quickly verify whether an actual product is produced with performances identical to those intended in a product design, a considerable time-period is practically required to obtain a final or actual product after the completion of the product design, due to respective time-periods required for a die design and a die processing. In addition, a product design change after the initiation of the die design will be forced to re-design the die in conformity with the change, which leads to an extended time-period required for the die re-design and a more delayed timing of obtaining the actual product.

In the field of portable phones or the like where products have a short life cycle, and new products are continuously introduced into market, there is a strong need for reducing the time-period of a die design as well as the time-period of a product design.

If a product design change after the initiation of a die design includes an undercut likely to be overlooked due to simple checking of product design drawings, the fact can be found after the completion of the die design based on the design change in some cases. A product having an undercut causes an increased cost of an associated die and an extended time-period required for molding one product, resulting in sharply increased molding cost per product.

SUMMARY OF THE INVENTION

In view of the above circumstances, it is therefore an object of the present invention to provide a die design support method and system capable of reducing the time-period required for a die design, allowing an unskilled die engineer to perform a die design without difficulties, and coping with a product design change in a short time-period.

In order to achieve the above object, the present invention provides a die design support method for supporting an operator to design a molding die of a product on a computer in accordance with a product design data of the product. This method comprises the steps of: dividing an operational procedure of designing a molding die of a specific type of products using CAD software, into a plurality of processes, and storing as a master die data each of the design procedures for the processes together with an associated CAD data, using an operational-record storing function of the CAD software; preparing as a standard layout a die layout model which defines respective models of die components estimated to be optimum in a die design for the specific type of products, and a layout thereof; in response to a request for designing a die for a new product belonging to the specific type, reading the master die data for the process to be executed among the plurality of processes; quoting a product design data of the new product belonging to the specific type or the models obtained in the previously executed process so as to execute the design procedure stored as the read master die data to create models in the currently executed process; and when the final process in the plurality of processes is executed to create respective final design data of the die components, using the die layout model directly, and quoting the models corresponding to the die components in the layout model and the models created by executing the precedent process, so as to execute the operational procedure stored as the master die data to create respective design data of the die components.

The present invention also provides a die design support system for supporting an operation of designing a molding die of a product using CAD software in accordance with a product design data of the product. This system comprises a master die data, which store an operational procedure of designing a molding die of a specific type of products using an operational-record storing function of the CAD software. The operational procedure is divided into a plurality of processes, and stored in the master die data together with associated CAD data. The system further includes data of a die layout model prepared as a standard layout to define respective models of die components estimated to be optimum in a die design for the specific type of products, and a layout thereof, and execution means, responsive to a request for designing a die for a new product belonging to the specific type, for reading the master die data for the process to be executed among the plurality of processes, and quoting a product design data of the new product belonging to the specific type or the models obtained in the previously executed process so as to execute the design procedure stored as the read master die data to create models in the currently executed process. In this system, when the execution means executes the final process in the plurality of processes to create respective final design data of die components, the means is operable to read and directly use the die layout model and quote the models corresponding to the die component in the layout model and models created by executing the precedent process, so as to execute the operational procedure stored as the corresponding master die data to create respective design data of the die components.

Other objects and advantages of the present invention will be understood from the following description of some preferred embodiments, and by reference to the accompanying drawings.

DESCRIPTION OF THE PREFERRED EMBODIMENT

Figure 1:
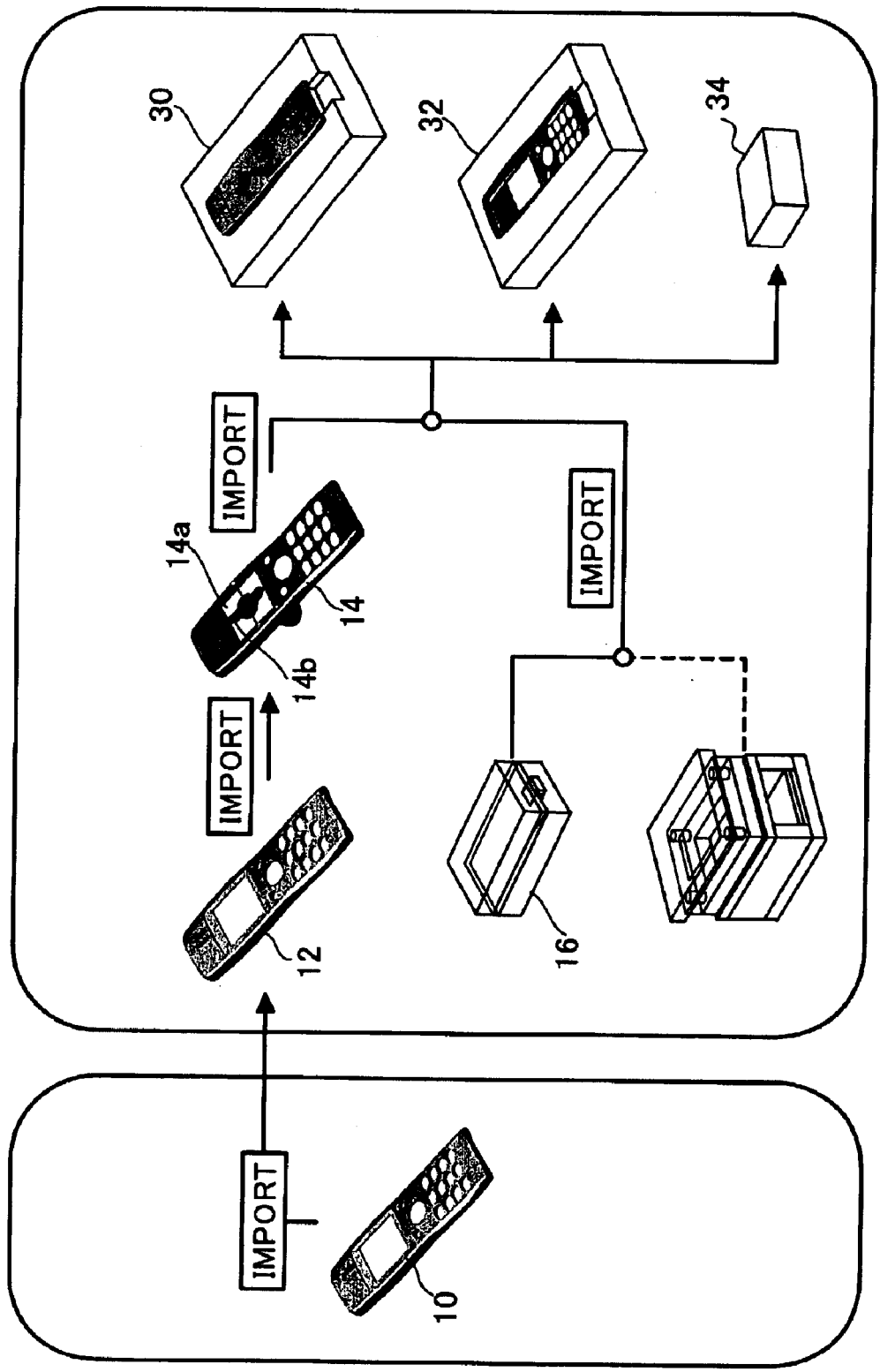
FIG. 1 is a schematic block diagram showing a data flow when a design data is created by reading a pre-stored master die data for designing a die of a portable phone case and quoting a design data of a new case.

With reference to the drawings, one embodiment of the present invention will now be described.

A die design support system according to one embodiment of the present invention is directed to facilitate quickly creating a design data of a molding die of a product using a computer. The content can be summarized as follows. A standard design procedure for designing a die is stored in advance using a function of a CAD system. When a design data concerning a product is entered, the system is operable to automatically execute the stored design procedure to the design data so as to create a design data of the die. The design procedure for a die design is generally selected by an engineer according to knowhow learned from his/her long-term experiences. Thus, the storage of the design procedure also means to store knowhow accumulated in years past.

In this embodiment, the entire design procedure for designing a die is divided into a plurality of processes and then stored, as described later. When a product design data is entered, the system is operable to quote this data to the first process of the divided design procedures, and automatically execute the design procedure for this process to create models in this process. Then, the system is operable to quote this data to the next process, and automatically execute the design procedure for this process to create models in this process. These operations will be repeated by the number of the divided processes to output the obtained result as a final die design data. In this embodiment, the entire design procedure is divided into the plurality because of a practical restriction that if an excessive processing is loaded on one process, none of widely used leading-edge computers has a sufficient performance capable of coping with such processing. Thus, the entire procedure divided into the plurality of processes is nothing but one embodiment, and the entire design procedure may be subjected to batch processing as a single process. It should be understood that such a modification is also encompassed within the scope of the present invention.

The process of storing the design procedure for a die design will be described below. In the die design support system according to this embodiment, a function incorporated in commercially available general CAD software is used to store the design procedure of a die design. Most of the commercially available CAD software, for example CATIA (trademark of DASSAULT) available from DASSAULT, have a function in which even if an operator makes an wrong operation, the process will be returned to a previous state to cancel the wrong operation and allow the operator to reattempt a new operation. For example, if the position of a hole opened at a certain portion during a process of creating a configuration in a virtual space on a computer screen has several mm of displacement, a new hole can be readily re-opened after cancelling the operation of opining the hole. This function can be achieved by storing the content of the operation made by the operator and an intermediate CAD data associated with the operation, as an operational record.

The die design support system of this embodiment employs the above function of storing an operational record, which is incorporated in general CAD software. For storing the design procedure of a die design in CAD software, it is required to perform an actual operation according to the procedure on the CAD software. Thus, an operator must carry out the operation of the entire procedure on the CAD software at least one time. The design procedure to be stored should be carefully determined in advance. Differently from a procedure including an engineer's operation made by trial and error, any unprofitable operation is omitted from the design procedure according to this embodiment to allow an desired model to be efficiently designed.

When a previous design procedure for a die of a specific type of products and data associated therewith are stored, a design procedure for a die of certain one product, such as an upper case of a portable phone, is reasonably standardized with respect to each of processes. For example, a die layout has various alternatives such as the necessity of a slide core to be used in addition to an upper-die-half and a lower-die-half, and the number or moving direction of the slide cores when used. However, in this embodiment, when the design procedures are stored in advance, a layout estimated to be optimum is determined as a standard layout in advance in consideration of versatility, operating efficiency, operationality or functional restriction of CAD systems. Then, in an actual die design stage, this layout will be directly used as much as possible. There has not been known such a concept.

The temporal criterion of the term "estimated to be optimum" is not the timing of designing a die of a new product but the timing of preparing a die layout model in advance before the former timing. This concept means to propose a previously unknown approach in which, a die layout estimated to be optimum when it is prepared in advance in a process, for example, of designing a die of a new product, is directly used as long as a certain level or more of quality can be maintained, instead of designing the best die layout for each die while spending much time. The new concept can advantageously omit a process of determining die components and a layout of the die components, which has occupied a substantial part of the time-period of the conventional die design, and allows any unskilled engineer to master an operation for designing a die having a certain level or more of quality, in a short time-period.

In this embodiment, a series of design procedures and associated CAD data, which are stored in advance to support a die design in the above manner, are collectively referred to as "master die data". There has been known neither the concept of the master die data nor the concept analogous thereto. As in CATIA, the general CAD software allows a file recording an operational record thereon to be independently exported. Thus, the exported master die data can be ported to another computer, and read from this computer to design a die using the same master die data on another computer incorporating the same CATIA.

When the pre-stored master die data is used, for example, to design a die of a newly designed case of a portable phone, CATIA is first activated to read the master die data corresponding to the first process of a die design of a previously designed portable phone case. As a result, a configuration created by the master die data will be displayed on a computer screen.

Then, a product design data serving as an initial data is quoted to the master die data using a quote function on CATIA, and the procedure left in the quoted design data as an operation record is automatically executed by executing a function "update" on CATIA. The update function is executed within an extremely short time or instantaneously completed, and a new model corresponding to the quoted initial data is created.

The same function is effectively achieved when the product design is changed. In this case, the stored operational procedure executed prior to the change is used as the aforementioned master die data to automatically execute the stored operational procedure to a changed product design data quoted as the initial data. As a result, a new model corresponding to the changed design data is instantaneously created. If a die engineer finds, for example, the presence of an undercut from the observation of the new model, the fact can be informed to a product engineer in a short time-period. In response to this information, the product engineer can cancel the design change or issue another design change, depending on the circumstances.

The types (range) of model capable of being created by one stored master die data are limited. For example, when a portable phone has two types: one type being folded into two along the centerline thereof, and the other type being not folded, it is necessary to prepare individual master die data for the two types of portable phones. However, once two types of master die data are prepared, the product design data corresponding to the master die data can be quoted to quickly create models in this process. While some correction is required for the created model in some cases, the operational time-period is significantly reduced as compared to the conventional method in which a die design is started again from the beginning to create models, even if taking the labor required for the correction into account.

As described above, the function of storing the operational record in the CAD system is provided to return a process to a previous state to cancel an operator's wrong operation and then allow the operator to perform an adequate operation. There has not been known any case of utilizing this function to store the master die data as in this embodiment. The technique employed in this embodiment allows an unskilled engineer to design a die quickly with a given level or more of quality.

The method of storing the master die data standardized for each product is varied according to CAD software to be used. Further, only if a person having ordinary skill in the art understands to utilize the function of keeping the operational record in the above manner, he/she can readily use the function to store and read the master die data required in each operation with advantage. Thus, any more description of the operation for storing the master die data will be omitted.

Taking a die design for a portable phone case as example, a case where a die design data is created using a pre-stored master die data will be described below.

Figure 2:
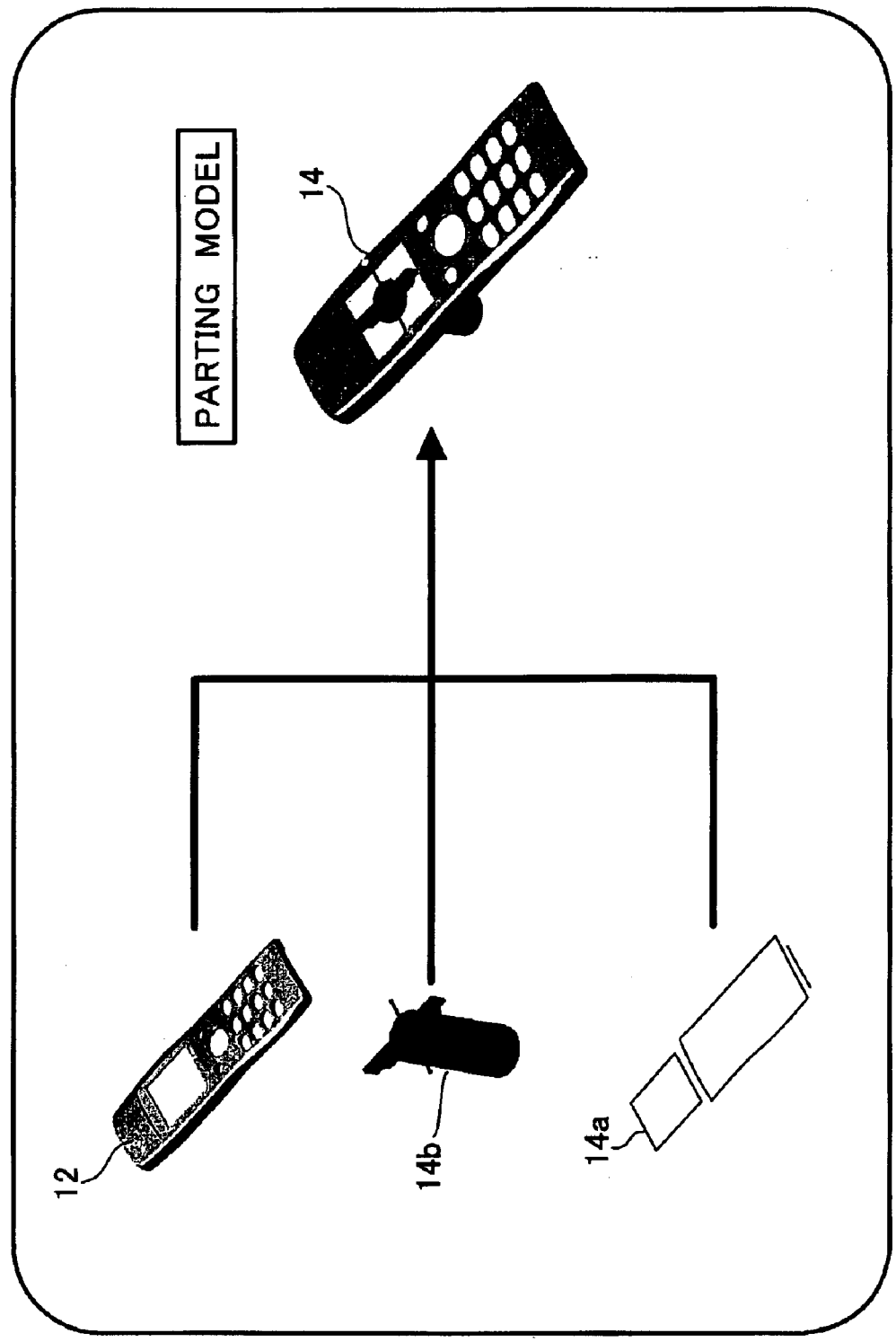
FIG. 2 is a schematic block diagram showing the data content of a parting model to be created in a die design process.
Figure 3:
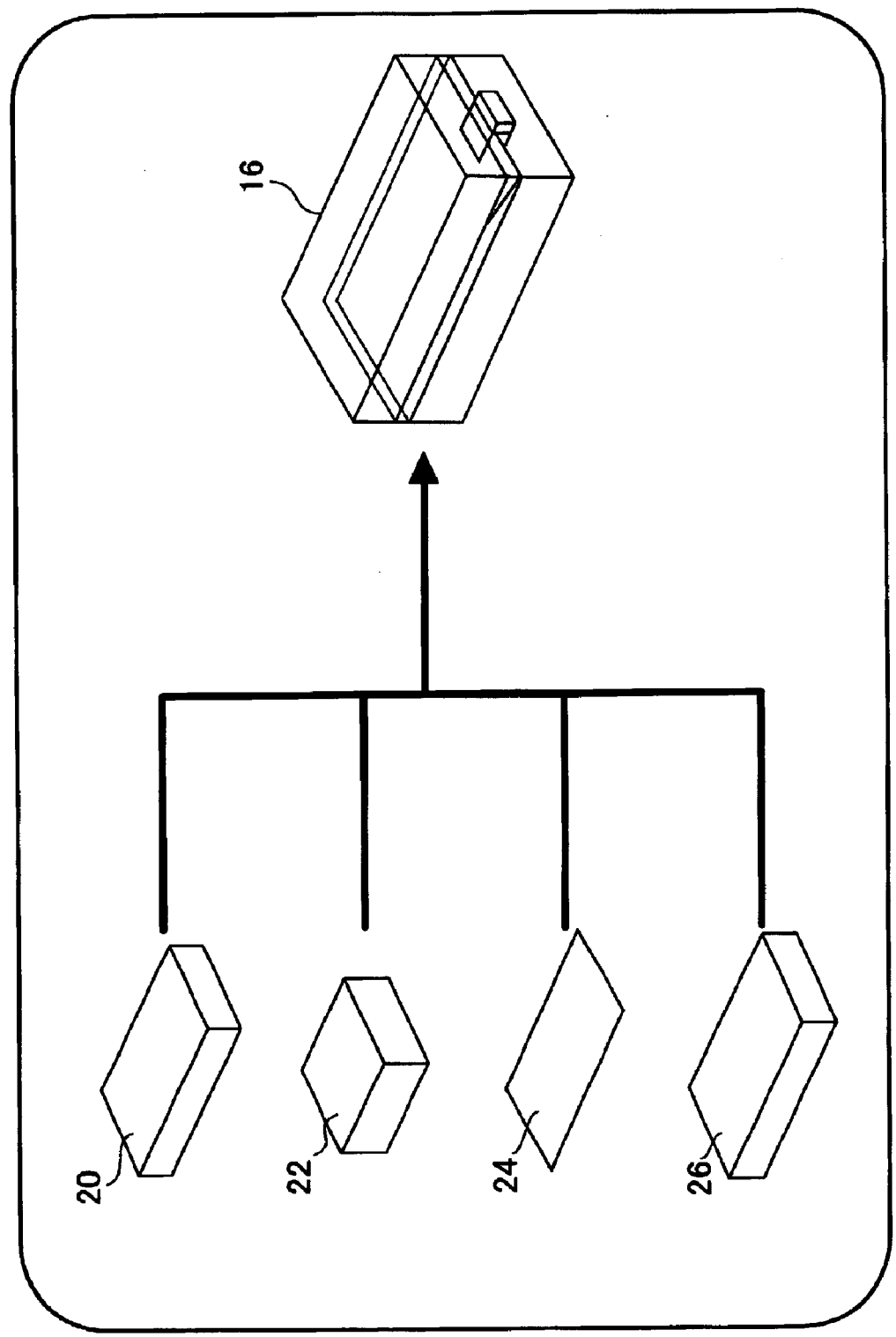
FIG. 3 is a schematic block diagram showing the data content of a die layout model.
Figure 4:
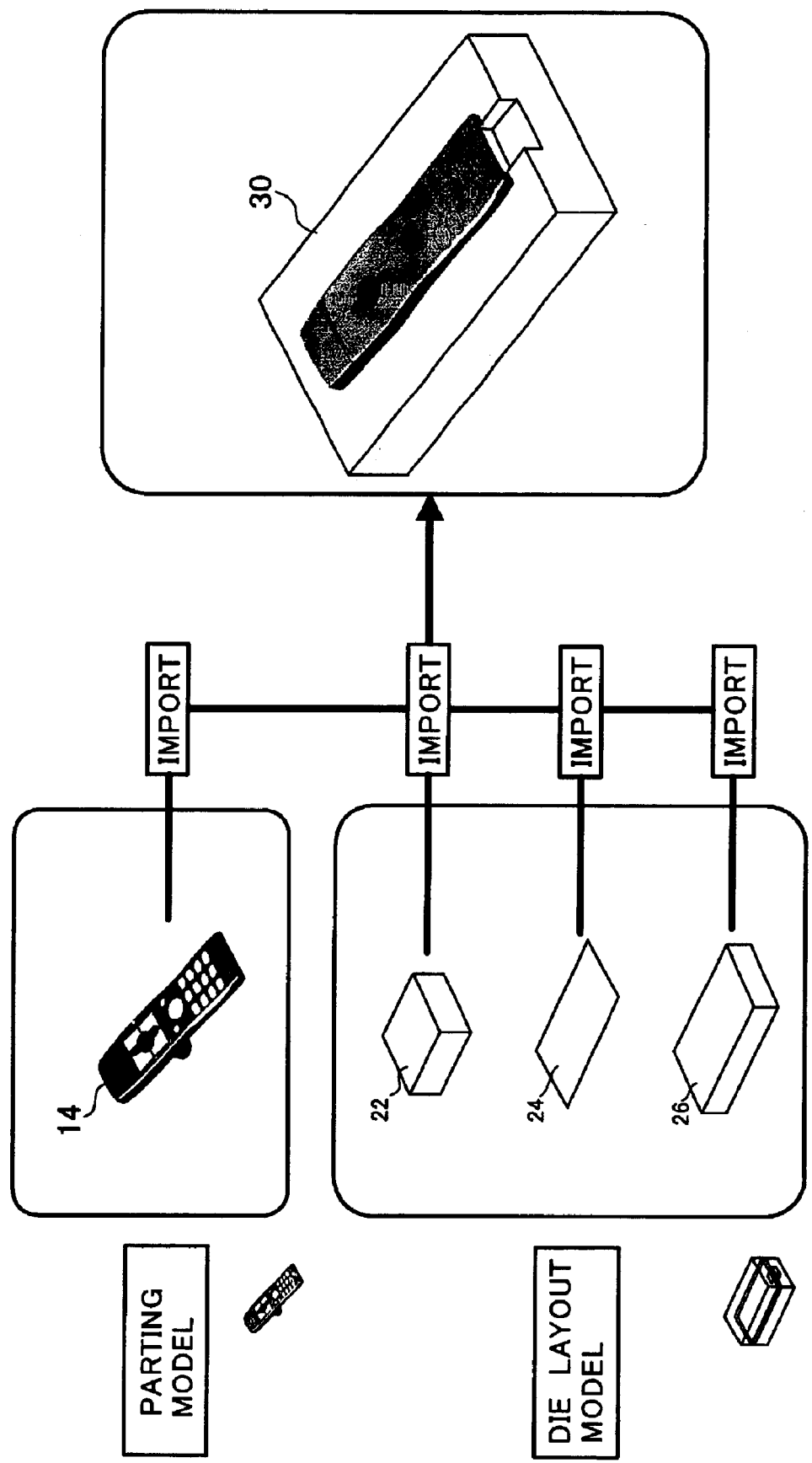
FIG. 4 is a schematic block diagram showing models required for creating a core (lower-die-half) data.
Figure 5:
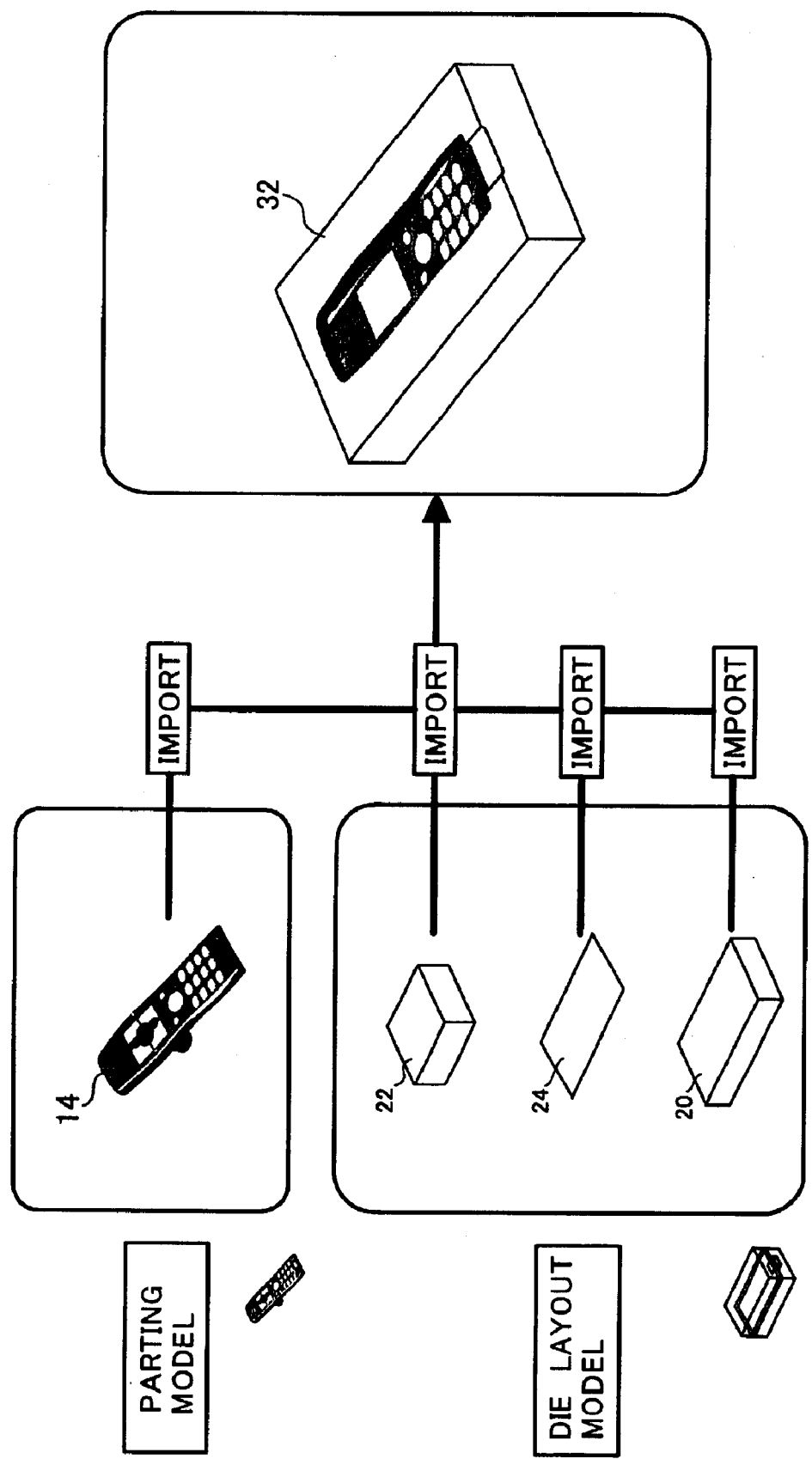
FIG. 5 is a schematic block diagram showing models required for creating a CAVI (upper-die-half) data.
Figure 6:
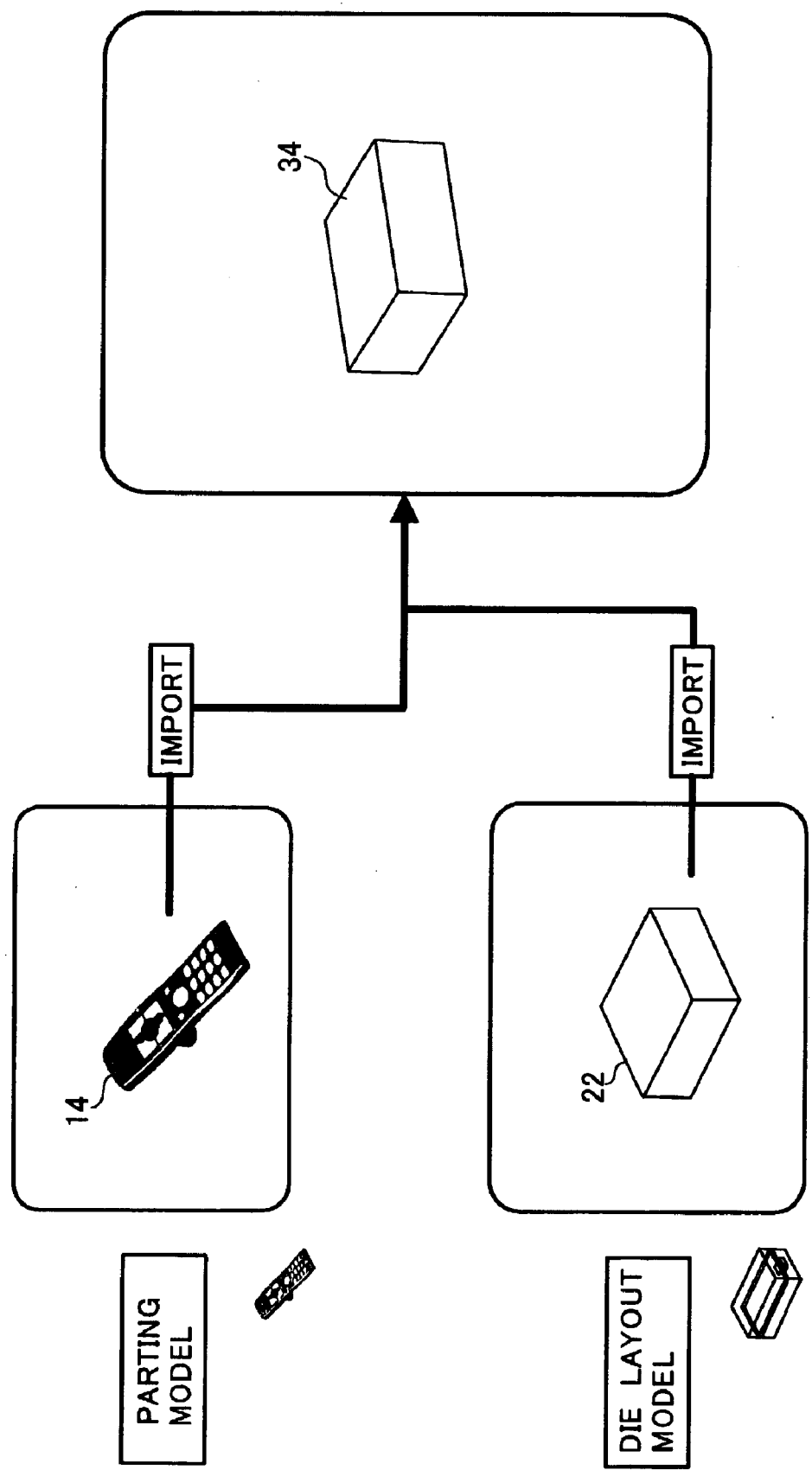
FIG. 6 is a schematic block diagram showing models required for creating a sliding core data.

FIG. 1 shows a data flow when a die design data is created by reading a pre-stored master die data for designing a die of a portable phone case and quoting a design data of a new case. FIG. 2 shows the data content of a parting model to be created in a die design process. FIG. 3 shows the data content of a die layout model. FIG. 4 shows models required for creating a core (lower-die-half) data. FIG. 5 shows models required for creating a CAVI (upper-die-half) data. FIG. 6 shows models required for creating a sliding core data.

In FIG. 1, a "product data" 10 is shown as a configuration of a design data which is created on a CAD system to design a die for a portable phone upper case and is to be displayed on a screen of a computer terminal.

An operator operates to read a part of a master die data for designing a molding die of a product (an upper case of a portable phone in this embodiment) to create a scaling model. The term "scaling model" herein means a model derived from multiplying the respective dimensions of the product data 10 by a contraction coefficient in consideration of contraction due to cooling and solidification of resin material. The master die data for the scaling model stores a series of operations performed to a certain basic initial data according to a given procedure on CATIA and data obtained in the course of the procedure. Thus, upon reading the above master die data, a configuration obtain through the series of operations performed to the initial data is displayed on the computer terminal screen.

In this state, the product data 10 of the portable phone case subject to a die design is quoted, and an "update" button (not shown) on CATIA is clicked with a mouse. In response to this operation, the computer performs a processing according to the operational procedure pre-stored as the master die data. This processing includes a processing for multiplying the respective dimensions of the case includes in the design data 10 by the contraction coefficient. As the result of the processing, a scaling model 12 is automatically created as shown in FIG. 1. On the computer terminal screen, the processing according to the update command is completed within a relatively short time, and the configuration of the un-quoted scaling model previously displayed on the terminal screen is changed into the scaling model 12 corresponding to the new product data as shown in FIG. 1 in a short time.

Then, the operator operates to read the master die data for creating a parting model on an operation screen of CATIA. The scaling model 12 is quoted to this master die data, and the update button (not shown) on CATIA is clicked with the mouse. In response to this operation, the computer internally performs a processing according to the operational procedure pre-stored as the master die data. As the result of this processing, a parting model 14 is automatically created as shown in FIG. 1.

As shown in FIG. 2, the parting model 14 in FIG. 1 is comprises of the scaling model 12, parting 14a and a gate 14b. The parting model plays a roll of closing button holes and a hole of a LCD screen to allow an upper-die-half and a lower-die-half to be released, and determining the position of a gate for injecting a molding material therethrough, as described later. If the gate is inadequately positioned, the case will have deformation or insufficient strength. While the gate design generally requires a lot of skill, the master die data of the pre-stored parting models as in this embodiment allows an unskilled die engineer to perform an adequate design.

As shown in FIG. 1, the parting model 14 includes the parting 14a and the gate 14b. The parting 14a is a socket to be inserted into the button holes and the hole for receiving the LCD screen therein, and the upper-die-half (CAVI) and the lower-die-half (CORE) can be released by providing the parting.

The gate 14b is a portion for supplying a molding material or resin into a die cavity. In this embodiment, the gate 14b is positioned such that the molding material is injected from the underside of the parting model 14 toward the central of the LCD screen, and then spreader over the entire region of the cavity.

As shown in FIG. 3, a die layout model 16 in FIG. 1 may comprises a CAVI base model 20, a slide-core base model 22, a parting base model 24 and a CORE base model 26. The die layout model 16 is prepared by standardizing in advance the arrangement of the respective base models, the moving direction of the slide-core base model, and the position of the paring on the outer side of the die, for each of the types of products, in consideration of versatility, operating efficiency, operationality or the like. In the die design stage using this master die data, the operator may directly used the die layout model 16, or may modify only a portion of the die layout model required for correction after determining if the parting has a defect on the outer side of a die prepared together with the die layout model 16.

Then, the operation advances to a process of creating a design data of a CORE 30, a CAVI 32 and a slide core 34. The CORE 30, the CAVI 32 and the slide core 34 can be independently created, and different operators may be simultaneously operated according to need.

In the process of creating the design data of the CORE, the operator operates to read the master die data of this process. Then, in addition to the parting model 14 required for creating the design data of the CORE, all of the slide-core base model 22, the parting base model 24 and the CORE base model 26 are quoted. As with the aforementioned processes, an "update" button on CATIA is then clicked with the mouse. In response to this operation, the computer performs a given processing to the parting model 14, the slide-core base model 22, the parting base model 24 and the CORE base model 26, according to the operational procedure pre-stored as the master die data. The content of this processing is arranged to create a configuration having a spatial reversed parting line.

As the result of this processing, a new CORE 30 as shown in FIG. 1 is automatically created. After the completion of the processing according to the update command, the display of the CORE base model 26 on the computer terminal screen is changed to the CORE 30 corresponding to the new product data. Based on the observation of the CORE, the creation of the design data of the CORE will be completed if no defect is observed, or a portion of the CORE required for correction will be modified if needed. In this operation, the operator may refer to a standard component model 18 according to need.

FIG. 5 shows a process of creating a design data of the CAVI. In the process of creating the design data of the CAVI in FIG. 5, in addition to the parting model 14, all of the CAVI base model 20, the slide-core base model 22 and the parting base model 24 are quoted. Other points are the same as those for the CORE in FIG. 4

FIG. 6 shows a process of creating a design data of the slide core. In the process of creating the design data of the slide core in FIG. 6, the slide-core base model 22 is quoted in addition to the parting model 14. Other points are the same as those for the CORE in FIG. 4 or for the CAVI in FIG. 6. Thus, after the completion of the processing on CATIA according to the update command, the design data CAVI 32 can be obtained.

As above, the die design data corresponding to the product design data in FIG. 1 is obtained by the CORE 30, the CAVI 32 and the slide core 34.

While the above embodiment has been described in connection with the die design for injection molding the portable phone case, the same concept can be applied to a die design for casting products such as automobile engines.

The die design support system according to the above embodiments can be used in the following design of a complicated/expensive die such as a die for engines. A rough product design is made in an initial stage, and a rough die design data is created using the rough product design. Then, a relatively detailed product design is made in an intermediate stage, and a relatively detailed die design is created using the relatively detailed product design. Finally, a fully detailed product design is made in a final stage, and a final die design is created using the fully detailed product design. The above process can provide a die design method in which a cost for forming the die is estimated using the rough die design data in the initial stage, the position of the parting line being determined using the die design data in the intermediate stage, and the final die design data being created using the product design data in the final stage. Even if a design change is issued in the process of the product design, the above synchronous process between the product design and the die design allows the die design to immediately respond to the design change with high efficiency.

In the conventional process, the die design is initiated after the product design is almost completed. Thus, the cost evaluation for producing a die and/or the position of a parting line cannot be determined until the product design data is entirely completed. In addition, if a design change is issues after the product design is completed once, the die design has to start from the beginning again, resulting in considerably extended time-period between the completion of the product design and the completion of the die design. According to the die design support system according to this embodiment, the die design can be completed approximately at the same timing as that of the product design to allow the time-period of the die design to be significantly reduced.

While the above embodiments have been described in connection with the system using CATIA available from DASSAULT as CAD software, the present invention is not limited to such software, but any other suitable CAD software product having a function of storing an operational record and reproducing the operation according to need may be used. Further, The software is not limited to CAD software, but any other software product, such as CMA, CAE or their combination, having a function of storing an operational record and reproducing the operation according to need may also be used.

As mentioned above, according to the present invention, the master die data including a series of pre-stored operational procedures to design a die using CAD or the like is stored in advance using a specific function of a CAD system or the like. When a die is actually designed, the master die data is read, and a product design data is supplied so as to automatically execute the operational procedures to approximately automatically create a die design data. This system can provide reduced time-period for the die design, and allows an unskilled die engineer to readily design a die. Further, the die design can be quickly changed in response to a product design change to create a modified die design data corresponding to the product after the design change in a short time-period. Further, the master die data may be fetched independently out of the CAD system by recording on a recording medium, to allow another CAD system to use the same master die data with high versatility.

What is claimed is:

1. A die design support method for supporting an operator to design a molding die of a product on a computer in accordance with a product design data of said product, said method comprising the steps of:

dividing an operational procedure of designing a molding die of a specific type of products using CAD software, into a plurality of processes, and storing as a master die data each of said design procedures for said processes together with an associated CAD data, using an operational-record storing function of said CAD software;

preparing as a standard layout a die layout model which defines respective models of die components estimated to be optimum in a die design for said specific type of products, and a layout thereof;

in response to a request for designing a die for a new product belonging to said specific type, reading the master die data for the process to be executed among said plurality of processes;

quoting a product design data of said new product belonging to said specific type or the models obtained in the previously executed process so as to execute the design procedure stored as said read master die data to create models in said currently executed process; and when the final process in said plurality of processes is executed to create respective final design data of said die components, using said die layout model directly, and quoting the models corresponding to said die components in said layout model and said models created by executing said precedent process so as to execute the operational procedure stored as the master die data to create respective design data of said die components.

2. A die design support system for supporting an operation of designing a molding die of a product using CAD software in accordance with a product design data of said product, said system comprising:

a master die data storing an operational procedure of designing a molding die of a specific type of products using an operational-record storing function of said CAD software, said operational procedure being divided into a plurality of processes and stored in said master die data together with associated CAD data;

data of a die layout model prepared as a standard layout to define respective models of die components estimated to be optimum in a die design for said specific type of products, and a layout thereof; and execution means, responsive to a request for designing a die for a new product belonging to said specific type, for reading the master die data for the process to be executed among said plurality of processes, and quoting a product design data of said new product belonging to said specific type or the models obtained in the previously executed process so as to execute the design procedure stored as said read master die data to create models in said currently executed process, wherein when said execution means executes the final process in said plurality of processes to create respective final design data of die components, said means is operable to read and directly use said die layout model and quote the models corresponding to said die component in said layout model and said models created by executing the precedent process, so as to execute the operational procedure stored as the corresponding master die data to create respective design data of said die components.

* * * * *